Patented June 24, 1930

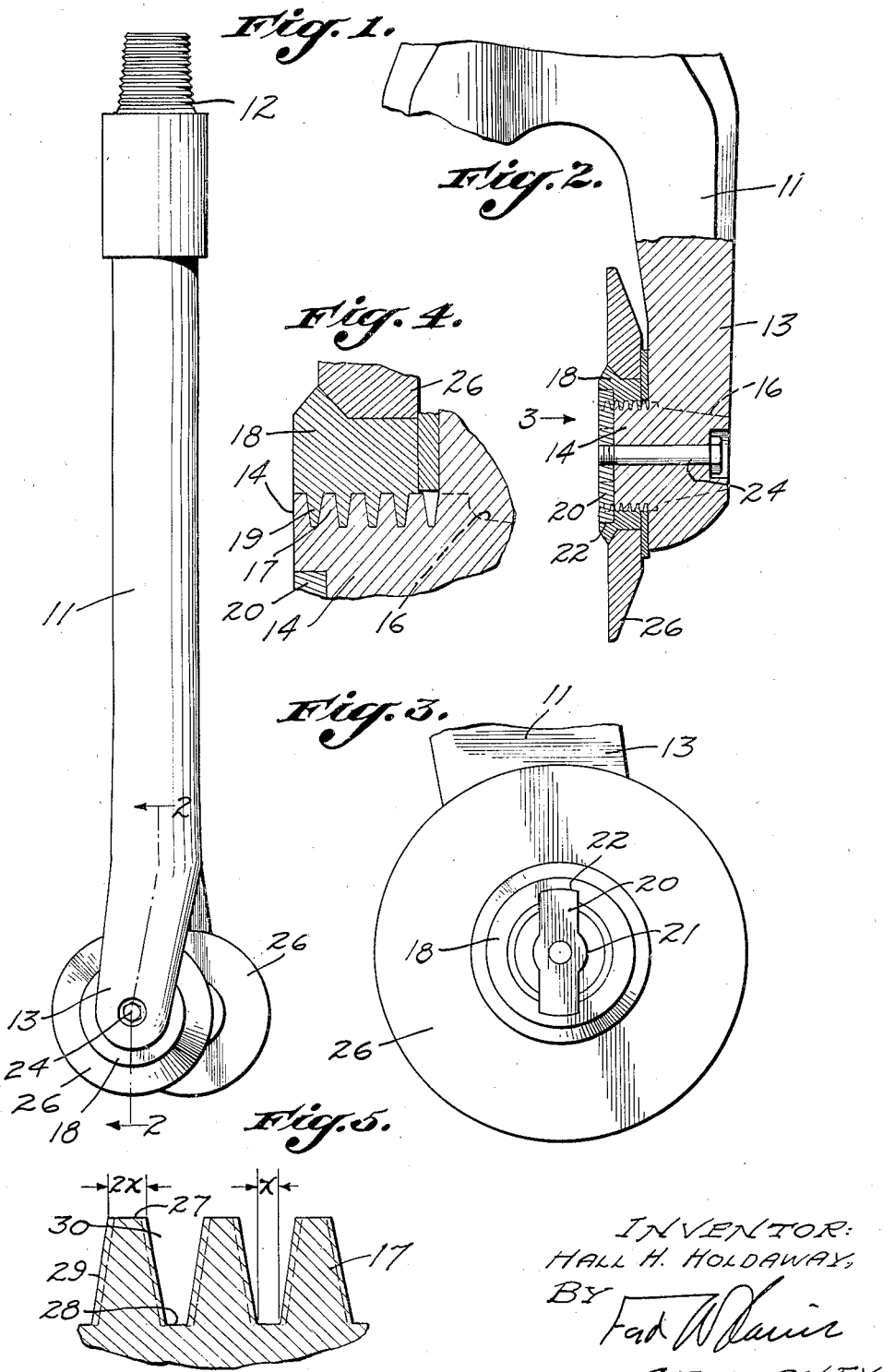

1,766,635

UNITED STATES PATENT OFFICE

HALL H. HOLDAWAY, OF LONG BEACH, CALIFORNIA, ASSIGNOR TO BYRON JACKSON CO., OF WEST BERKELEY, CALIFORNIA, A CORPORATION OF DELAWARE

PIN THREAD FOR DISK-BIT MOUNTINGS

Application filed July 26, 1927. Serial No. 208,498.

My invention relates to drilling apparatus and particularly to rotary bits.

In the oil producing industry in which this invention has a marked utility it is common practice to drill a hole by means of a bit which is secured to the lower end of a drill column, this drill column being rotated by mechanism at the surface of the ground. One form of rotary bit used is known as the disk bit consisting of a body having rotatable cutting disks attached thereto. It is common practice to form the body of the disk bit with threaded pins onto which threaded nuts are screwed for securing the disk cutters in place. The pins and nuts are provided with standard V-shaped or acme threads. There is considerable wear both on the pins and the nuts, and with the common form of construction it is necessary to reform the pins as often as it is necessary to replace the nuts. Considerable expense is connected with the reforming of the cutter pins with new threads in view of the fact that the entire pin must be replaced. On the other hand, it is a very simple and economical thing to replace the nuts.

It is an object of this invention to provide a pin and nut construction in which the threads on the pin will not wear out as quickly as the threads on the nut.

Another object of the invention is to provide a threaded pin and nut arrangement in which the threads of the pin are substantially twice the area of cross-section as the threads of the nut.

Other objects and advantages of the invention will be made evident hereinafter.

My invention is illustrated in the accompanying drawing in which:

Fig. 1 is an elevational view of a bit embodying the features of the invention.

Fig. 2 is an enlarged fragmentary section taken on the line 2—2 of Fig. 1.

Fig. 3 is a view taken as indicated by the arrow 3 of Fig. 2.

Fig. 4 is an enlarged fragmentary section showing the nut screwed on the pin of the invention.

Fig. 5 is an enlarged fragmentary sectional view showing clearly the thread construction of the invention.

Referring in detail to the drawing, the numeral 11 represents the shank of a bit, this shank having a threaded pin 12 at the upper end thereof by means of which the bit is attached to the lower end of a string of drill pipe. The lower end of the bit 11 is provided with offset legs 13 which, as shown clearly in Fig. 2, are provided with inwardly extending integral pins 14. The pins 14 are, when first made, separate from the legs 13 and are extended into sockets indicated by dotted lines 16 of Fig. 2, being thereafter welded in place, thus making the parts integral. This idea is covered by a previous patent. The inner ends of the pins 14 are provided with threads 17 and screwed onto the pins 14 are nuts 18 having screw threads 19. The nuts 18 are locked in place by keys 20 which rest in cavities 21 in the inner ends of the pins 14 and extend into recesses 22 formed in the nuts 18. The keys 20 are secured in place by bolts 24. Rotatable on the nuts 18 are cutters 26 which are preferably disk cutters.

The essence of this invention resides in the novel form of thread construction which is illustrated best in Figs. 4 and 5. The threads 17 and 19 are neither V-shaped threads nor square threads nor acme threads. It is believed that they are entirely new. The threads 17 are provided with flat top faces 27 and flat bottom faces 28 which are joined together by flat side faces 29. The area of cross-section of the threads 17 is substantially twice that of the spaces 30 which exist between the threads. The width of the bottom faces 28 is indicated by the distance X and the width of the top faces 27 is indicated by the distance 2X; in other words, the top faces are substantially twice the width of the bottom faces. It is not essential that the faces 27, 28 and 29 be flat, as shown, but this is the best form from a practical standpoint. The important part of the invention is that the threads 17 are much wider than the spaces 30 between them. The threads 19 of the nuts 18 are formed as illustrated, so that the area of cross-section thereof is substantially one-half the area of the spaces between them. The threads 17 closely fit the threads 19 so as to avoid any looseness of the nut 18 thereon, and the nut is removable from the pin.

The thread construction of the invention provides threaded pins 14 with threads 17 which have a much longer life than the ordinary V-shaped or acme threads of the same pitch, as ordinarily provided on the pins of the disk bits. This results from forming the threads, according to this invention so that they are of a larger area of cross-section than the spaces between them. The nuts 18 will probably not have as long a life as those in use at the present time, but in view of the fact that the nuts may be so cheaply replaced there is a substantial saving in not having to replace the pins 14 as often as was previously necessary.

In the foregoing description I have illustrated the invention in use on disk bits. It should be understood that my invention may be incorporated in any structures which are threadedly connected together and in which one threaded part is much more difficult or much more expensive to replace.

I claim as my invention:

In combination, a body, a metal pin projecting from the body and provided with external threads, a metal nut having internal threads, the nut being a more easily replaceable member than the pin, the threads of the nut and the threads of the pin closely fitting substantially throughout the length of the threads of the nut to maintain and secure frictional coupling of the nut and pin releasable at will to permit removal of the nut from the pin, and the threads on the pin being of substantially greater cross-sectional area than the threads of the nut.

In testimony whereof, I have hereunto set my hand at Albany, New York, this 25th day of July, 1927.

HALL H. HOLDAWAY.